(12) United States Patent
Jain et al.

(10) Patent No.: US 11,122,499 B2
(45) Date of Patent: Sep. 14, 2021

(54) SYSTEMS, METHODS, AND APPARATUSES FOR DIAMETER BASED INTERFACES TO ENABLE RESTRICTIONS OF COVERAGE ENHANCEMENT IN WIRELESS NETWORKS

(71) Applicant: APPLE INC., Cupertino, CA (US)

(72) Inventors: Puneet Jain, Hillsboro, OR (US); Vivek Gupta, San Jose, CA (US)

(73) Assignee: APPLE INC., Cupertino, CA (US)

(*) Notice: Subject to any disclaimer, the term of this patent is extended or adjusted under 35 U.S.C. 154(b) by 28 days.

(21) Appl. No.: 16/475,624

(22) PCT Filed: Feb. 1, 2018

(86) PCT No.: PCT/US2018/016389
§ 371 (c)(1),
(2) Date: Jul. 2, 2019

(87) PCT Pub. No.: WO2018/144697
PCT Pub. Date: Aug. 9, 2018

(65) Prior Publication Data
US 2021/0144624 A1 May 13, 2021

Related U.S. Application Data

(60) Provisional application No. 62/453,976, filed on Feb. 2, 2017.

(51) Int. Cl.
*H04W 48/02* (2009.01)
*H04W 48/12* (2009.01)

(52) U.S. Cl.
CPC ........... *H04W 48/12* (2013.01); *H04W 48/02* (2013.01)

(58) Field of Classification Search
CPC .............................. H04W 48/12; H04W 48/02
USPC ........................................................ 455/434
See application file for complete search history.

(56) References Cited

U.S. PATENT DOCUMENTS

2016/0316491 A1* 10/2016 Axmon ................. H04L 1/1812
2019/0110241 A1* 4/2019 Jain ....................... H04W 24/02

OTHER PUBLICATIONS

Ericsson, "Authorization of Use of Coverage Enhancements", R2-166564, 3GPP TSG-RAN2 Meeting #95bis, Kaohsiung, Taiwan, Agenda Item 8 11.4 Other, Oct. 10-14, 2016, 6 pages.

(Continued)

*Primary Examiner* — Ted M Wang
(74) *Attorney, Agent, or Firm* — Stoel Rives LLP

(57) ABSTRACT

Diameter based interfaces are configured to enable restriction of a coverage enhancement feature or mode. A service capability exposure function (SCEF) communicates through a Diameter based interface (e.g., S6t interface) with an HSS to control whether a user equipment (UE) is restricted from operation in an enhanced coverage mode. The SCEF may process an enhanced coverage request. In response, the SCEF generates a configuration information request (CIR) for a home subscriber server (HSS). The CIR may include an AVP to query enhanced coverage restrictions for the UE. The SCEF may also process a configuration information answer (CIA) from the HSS. The CIA may include an enhanced-coverage-restriction-data AVP indicating current settings of the enhanced coverage restrictions for the UE.

20 Claims, 8 Drawing Sheets

(56) References Cited

OTHER PUBLICATIONS

ETSI TS 129.336, "Universal Mobile Telecommunications System (UMTS); LTE; Home Subscriber Server (HSS) Diameter Interfaces for Interworking With Packet Data Networks and Applications (3GPP TS 29.336 version 13.6.0 Releas 13)", V13.6.0, Jan. 2017, 57 pages.
Intel, "Support of Enhanced Coverage Authorization Control via SCEF", S2-166938, SA WG2 Meeting #118, Reno, Nevada, USA, Change Request 23.682 CR 0235, Rev 4, Current Version 14 1.0, Nov. 14-18, 2016, 4 pages.
Intel, "Update to the solution 1 on Authorization of Coverage Enhancements", S2-164561, SA WG2 Meeting (Temporary Document) #116BIS, Sanya, China, Agenda Item 6.15, Aug. 29-Sep. 2, 2016, 5 pages.
Nokia, "Enhanced Coverage", C4-171420, Revision of C4-171314, 3GPP Tsg CT4 Meeting #76, Dubrovnik, Croatia, Change Request 29.336 CR 0068 rev 2 Current version 14.0.0, Feb. 13-17, 2017, 17 pages.
PCT/US2018/016389, International Search Report and Written Opinion, dated Apr. 16, 2018, 16 pages.

\* cited by examiner

SYSTEMS, METHODS, AND APPARATUSES FOR DIAMETER BASED INTERFACES TO ENABLE RESTRICTIONS OF COVERAGE ENHANCEMENT IN WIRELESS NETWORKS

RELATED APPLICATIONS

This application claims the benefit of U.S. Provisional Patent Application No. 62/453,976, filed Feb. 2, 2017, which is hereby incorporated by reference herein in its entirety.

TECHNICAL FIELD

This application relates generally to wireless communication systems, and more specifically to enabling restrictions of coverage enhancement in these systems.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi; and the MulteFire standard developed by MulteFire Alliance. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE) and in MulteFire systems can include a MF-AP. In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

Machine type communication (MTC) represents a growth opportunity for the 3GPP ecosystem. To support Cellular Internet of Things (CIoT), 3GPP operators address usage scenarios with devices that are power efficient (e.g., with battery life of several years), that can be reached in challenging coverage conditions (e.g., indoors and in basements), and that are cheap enough so that they can be deployed on a mass scale and may even be disposable.

DETAILED DESCRIPTION OF PREFERRED EMBODIMENTS

Figure 1:
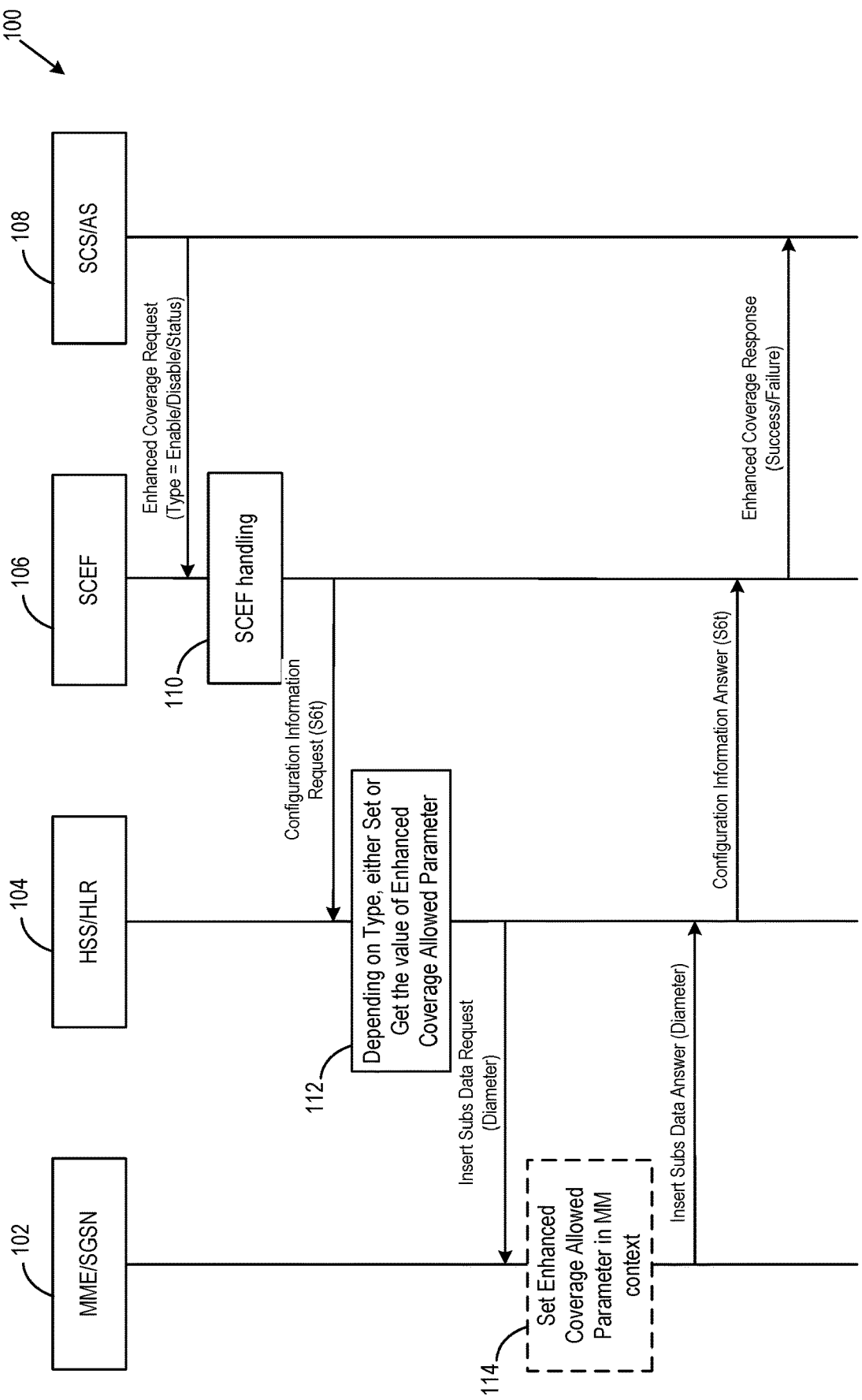
FIG. 1 is a simplified signal flow diagram illustrating a process for determining whether a UE is restricted from operation in an enhanced coverage mode according to one embodiment.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

In some embodiments, coverage enhancements may include a functionality that provides for redundant transmission of the same data packets to overcome some of the challenging coverage conditions that can accompany MTC or CIoT communications. The usage of coverage enhancements may require extensive resources from the network. Therefore it should be possible to authorize usage of the coverage enhancements' functionality to ensure that only specific subscribers (e.g., those subscribed to use this service) are able to benefit from the feature. Certain embodiments herein are directed as enhancements to Diameter based interfaces to enable restriction of the coverage enhancement feature or mode. A home subscriber server (HSS) communicates using the Diameter protocol, which is an authentication, authorization, and accounting protocol wherein applications are defined by application identifiers and can add new command codes and/or new attribute-value pairs (AVPs).

In one embodiment, for example in a 4G/LTE network, a service capability exposure function (SCEF) communicates through a Diameter based interface with an HSS to determine whether a UE is restricted from operation in an enhanced coverage mode. The SCEF may process an enhanced coverage request from a services capability server (SCS) and/or an application server (AS). The enhanced coverage request may include an identifier of the UE. In response to the enhanced coverage request, the SCEF may store the UE identifier and generate a configuration information request (CIR) for the HSS. The CIR may include the identifier of the UE and an enhanced-coverage-restriction AVP to query enhanced coverage restrictions for the UE. The SCEF may also process a configuration information answer (CIA) from the HSS. The CIA may include an enhanced-coverage-restriction-data AVP indicating current settings of the enhanced coverage restrictions for the UE. The SCEF may then generate an enhanced coverage response for the SCS/AS to indicate, based on the current settings of the enhanced coverage restrictions for the UE, whether the UE is restricted from operation in an enhanced coverage mode.

Although the terminology may be different in a 5G system, the underlying principles may be the same. For example, in one embodiment, a network exposure function (NEF) may communicate through a Diameter based interface or a service based interface with a unified data management function (UDM) to determine whether a UE is restricted from operation in an enhanced coverage mode. The NEF may process an enhanced coverage request from an application function (AF). In response to the enhanced coverage request, the NEF may encode a CIR command for the UDM. The CIR command may include a query for current settings of an enhanced-coverage-restriction AVP corresponding to a UE. The NEF may process a CIA command from the UDM that includes an enhanced-coverage-restriction-data AVP comprising the current settings of the enhanced-coverage-restriction-attribute AVP for the UE. The NEF may also generate an enhanced coverage response for the AF to indicate, based on the current settings, whether the UE is restricted from operation in an enhanced coverage mode.

FIG. 1 is a simplified signal flow diagram illustrating a process 100 for determining whether a UE is restricted from operation in an enhanced coverage mode according to one embodiment. The illustrated example includes signaling among a mobility management entity (MME) or serving general packet radio service (GPRS) supporting node (SGSN) (shown as MME/SGSN 102), an HSS 104, an SCEF 106, and an SCS/AS 108. The SCEF 106 may communicate with the HSS 104 through a Diameter based S6t interface. The HSS 104 may also communicate with the MME/SGSN 102 through a Diameter based interface such as S6a/d. The S6t interface between the SCEF 106 and the HSS 104, and/or the Diameter interface (e.g., S6a/d) between the HSS 104 and the MME/SGSN 102 is enhanced according to embodiments described herein.

As shown in FIG. 1, the SCS/AS 108 sends an enhanced coverage request message to the SCEF 106. The enhanced coverage request message may include, for example, an external identifier (ID) of the UE or mobile station international subscriber directory number (MSISDN), an SCS/AS ID, an SCS/AS reference ID, and/or a Type. The Type indicates if the request is to get status of, or to enable, or to disable the enhanced coverage.

In an SCEF handling function 110, the SCEF 106 stores the SCS/AS reference ID, and the SCS/AS ID, and assigns an SCEF reference ID. Based on operator policies, if either the SCS/AS is not authorized to perform this request (e.g., if the service level agreement (SLA) does not allow for it), or the enhanced coverage request is malformed, or the SCS/AS 108 has exceeded its quota or rate of submitting enhanced coverage requests, the SCEF 106 provides an enhanced coverage response to the SCS/AS 108 with a cause value appropriately indicating a failure result.

The SCEF 106 sends a configuration information request (CIR) message or command through the S6t interface to the HSS 104. The CIR may include the external ID or MSISDN, the SCEF ID, SCEF Reference ID, and/or the Type. As discussed below, the S6t interface is enhanced according to certain embodiments with new AVP(s) in the CIR for restriction of enhanced coverage.

The HSS 104 examines the configuration information request message, e.g., with regard to the existence of the external ID or MSISDN, whether any included parameters are in the range acceptable for the operator, whether the enhanced coverage is supported by the serving MME/SGSN 102. If this check fails, the HSS 104 sends a configuration information answer (CIA) message or command through the S6t interface to the SCEF 106 and includes a cause value indicating the reason for the failure condition.

In a function 112, depending on the Type, the HSS 104 either sets or gets the value of the enhanced coverage allowed parameter. If the Type is to get the current status of enhanced coverage, for example, the HSS 104 retrieves the value and sends CIA through the S6t interface to the SCEF 106. As discussed below, the S6t interface is enhanced according to certain embodiments with new AVP(s) in the CIA for restriction of enhanced coverage. If, however, the Type is to enable or to disable the enhanced coverage, the HSS 104 sets enhanced coverage allowed parameter to the appropriate value.

If the Type is to set the enhanced coverage allowed parameter in the mobility management (MM) context, the HHS 104 sends an insert subscriber data request message through the Diameter interface to the MME/SGSN 102. The insert subscriber data request message may include the Type, the SCEF ID, and/or the SCEF reference ID). Based on operator policies, the MME/SGSN 102 may reject the request (e.g., overload or HSS 104 has exceeded its quota or rate of submitting enhanced coverage requests defined by the SLA). At a function 114, the MME/SGSN 102 may set or reset (i.e., enable or disable) the enhanced coverage allowed parameter in the MME/SGSN context. If the enhanced coverage allowed parameter value update is successful, the MME/SGSN 102 sends an insert subscriber data answer (cause) message to the HSS 104. The MME/SGSN 102 may include the enhanced coverage allowed parameter value in the insert subscriber data answer message.

The HSS 104 sends CIA (e.g., with the SCEF reference ID, and cause) message to the SCEF 106. The HSS 104 includes result=success/failure and the enhanced coverage allowed parameter value (in case of success) in the CIA message. In the case of UE mobility, the HSS 104 may determine whether a new MME/SGSN supports enhanced coverage.

The SCEF 106 sends an enhanced coverage response (e.g., include the SCS/AS reference ID, and cause) message to the SCS/AS 108. The HSS 104 includes result=success/failure and may include the enhanced coverage allowed parameter value (in case of success) in the enhanced coverage response message. If the HSS 104 detects that the current serving MME/SGSN 102 cannot support enhanced coverage (e.g., after a UE mobility event), the HSS 104 may notify the SCEF 106 that the enhanced coverage allowed is disabled, and may set enhanced coverage allowed to disabled value.

As discussed above, certain embodiments update the S6t interface by adding new AVPs for restriction of enhanced coverage. Examples are provided below.

Figure 2:
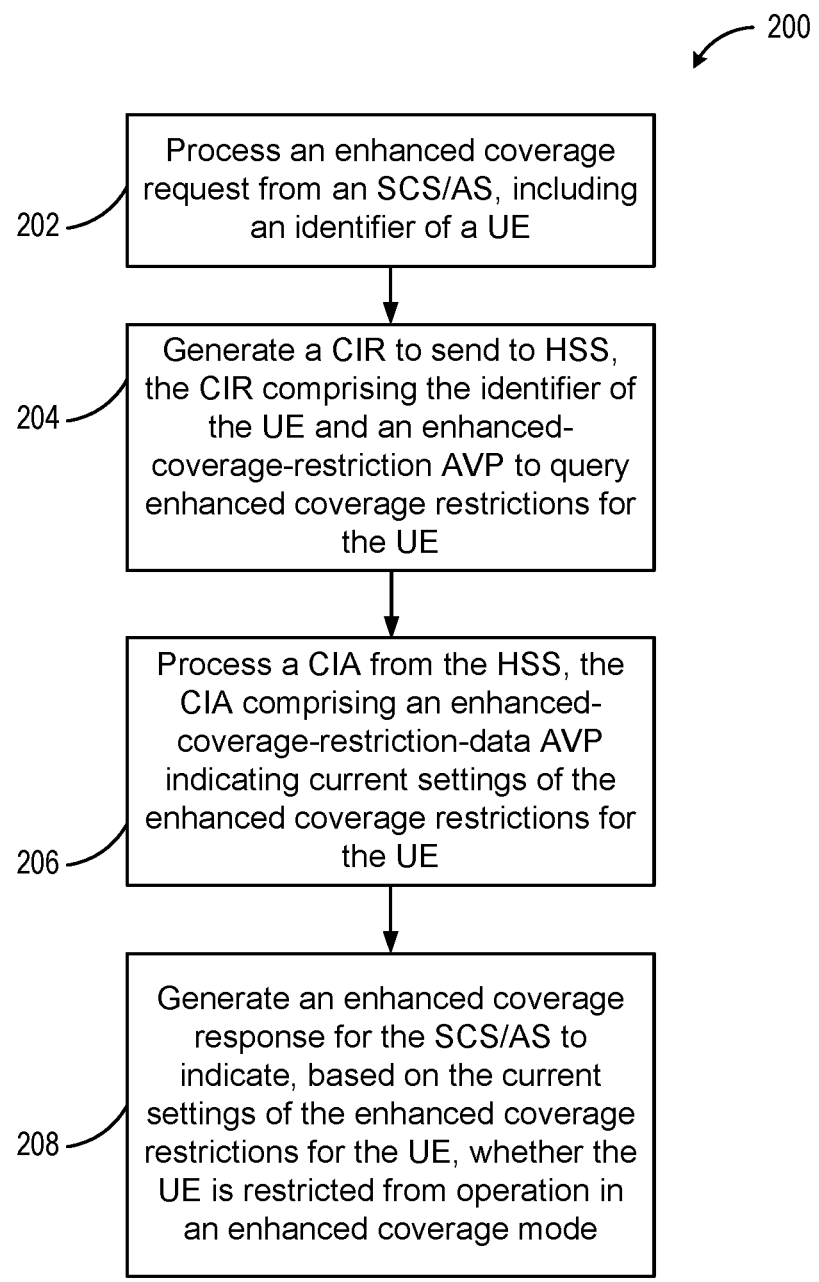
FIG. 2 is a flow diagram of a method for controlling enhanced coverage restrictions for a UE according to one embodiment.

FIG. 2 is a flow diagram of a method 200 for controlling enhanced coverage restrictions for a UE according to one embodiment. The method 200 may be performed, for example, by the SCEF 106 shown in FIG. 1. The method 200 includes processing 202 an enhanced coverage request from an SCS/AS. The enhanced coverage request may include an identifier of a UE. The method 200 further includes generating 204 a CIR to send to an HSS. The CIR comprises the identifier of the UE and an enhanced-coverage-restriction AVP to query enhanced coverage restrictions for the UE. The method 200 further includes processing 206 a CIA from the HSS. The CIA comprises an enhanced-coverage-restriction-data AVP indicating current settings of the enhanced coverage restrictions for the UE. The method 200 also includes generating 208 an enhanced coverage response for the SCS/AS to indicate, based on the current settings of the enhanced coverage restrictions for the UE, whether the UE is restricted from operation in an enhanced coverage mode. Additional details of the method 200 are located throughout the present specification, including the Examples section.

Configuration Information on S6t

According to certain embodiments, the configuration information procedure on the S6t interface (see, e.g., 3GPP TS 29.336) is used between the SCEF 106 and the HSS 104 for: the configuration/deletion of monitoring events; the configuration/deletion of communication patterns; and the configuration/query of enhanced coverage restrictions. The following events may be configured for monitoring: the association of the UE and universal integrated circuit card (UICC) and/or new international mobile subscriber identity (IMSI)-international mobile station equipment identity WED-software version (SV) association; the UE reachability; location of the UE, and change in location of the UE; loss of connectivity; communication failure; roaming status (i.e., roaming or no roaming, visited public land mobile network (VPLMN-ID) of the UE, and change in roaming status of the UE; and availability after data downlink notification (DDN) failure.

The configuration information procedure on S6t is mapped to the commands CIR and CIA in the Diameter protocol (see below). TABLE 1 shows the details for the involved information elements (e.g., updated/new CIR-Flags and Enhanced Coverage Restriction) for CIR, according to one embodiment. TABLE 2 shows the details for the involved information elements (e.g., new Enhanced Coverage Restriction Data) for CIA, according to one embodiment. In the tables herein, "Cat." or "M/O" defines if a certain element or feature is mandatory or optional, according to certain embodiments.

TABLE 1

| Configuration Information Request (CIR) | | | |
|---|---|---|---|
| Information Element Name | Mapping to Diameter AVP | Cat. | Description |
| User Identity | User-Identifier | M | This Information Element shall contain the identity of the UE. This is a grouped AVP containing either an External Identifier or an MSISDN (exactly one, and only one, of those identifiers shall be included in the request). |
| Supported Features | Supported-Features | O | If present, this Information Element shall contain the list of features supported by the origin host. |
| Monitoring Event Configuration | Monitoring-Event-Configuration | O | If present, this Information Element shall contain the details of Monitoring event(s). Multiples instances covering different monitoring events may be present. |
| AESE Communication Pattern | AESE-Communication-Pattern | O | If present, this Information Element shall contain the details of Communication Pattern(s). Multiples instances covering different communication patterns may be present. |
| CIR-Flags (see below) | CIR-Flags | O | If present, this Information Element shall contain a bit mask. See below for the meaning of the bits. |
| Enhanced Coverage Restriction (see below) | Enhanced-Coverage-Restriction | O | If present, this Information Element shall contain the updates of the Enhanced Coverage Restriction. |

TABLE 2

Configuration Information Answer (CIA)

| Information Element Name | Mapping to Diameter AVP | Cat | Description |
|---|---|---|---|
| Result | Result-Code/Experimental-Result | M | Result of the request. Result-Code AVP shall be used for errors defined in the Diameter Base Protocol. Experimental-Result AVP shall be used for S6t errors. This is a grouped AVP which contains the 3GPP Vendor ID in the Vendor-Id AVP, and the error code in the Experimental-Result-Code AVP. This AVP reflects the outcome of the procedure on Diameter level. |
| User Identity | User-Identifier | C | This information element shall contain the User Identity of the UE. This is a grouped AVP containing an External Identifier or an MSISDN. This IE shall be present only when the Result-Code is DIAMETER_SUCCESS. |
| Supported Features | Supported-Features | O | If present, this information element shall contain the list of features supported by the origin host. |
| Monitoring Event Report | Monitoring-Event-Report | O | If an immediate report is available this information element shall contain the requested data available in the HSS. |
| AESE Communication Pattern Config Status | AESE-Communication-Pattern-Config-Status | O | If present, this Information Element shall contain the details of Communication Pattern-Config-Status (s). Multiples instances covering different communication patterns configuration statuses may be present. |
| Monitoring Event-Config Status | Monitoring-Event-Config-Status | O | If present, this information element shall contain the result of an individual Monitoring event request identified by its SCEF reference ID. |
| Supported Services | Supported-Services | O | If present, this Information Element shall contain AVPs indicating details of the services supported by the HSS. |
| S6t-HSS Cause | S6t-HSS-Cause | C | This information element shall contain an indication of Absent Subscriber. It shall be present if the user is not registered in any serving node. |
| Enhanced Coverage Restriction Data (see below) | Enhanced-Coverage-Restriction-Data | C | This information element shall contain the result of a status query for Enhanced Coverage restriction control. It shall be present if the request contained a CIR-Flag AVP with the bit for Enhanced-Coverage-Query set. |

Behavior of the HSS

According to certain embodiments, when the CIR is received from the SCEF 106, the HSS 104 performs the following process. Check that the user identity for whom data is asked exists in HSS 104. If not, Experimental-Result are set to DIAMETER_ERROR_USER_UNKNOWN in the CIA. Check whether the requesting SCEF 106 is authorized to request the specified service (e.g., presence of Monitoring Event Configuration AVP indicates the service). If not, Experimental-Result are set to DIAMETER_ERROR_UN-AUTHORIZED_REQUESTING_ENTITY (5510) in the CIA. Check that the requested service (e.g., Monitoring Event Configuration AVP or Enhanced Coverage Restriction Configuration AVP) is authorized for the UE. If not, Experimental-Result are set to DIAMETER_ERROR_UNAU-THORIZED_SERVICE (5511) in the CIA. If a serving node is registered and is involved in the reporting of the configured monitoring event, the HSS 104 forwards the monitoring event configuration to the serving node and waits for the answer before sending the CIA to the SCEF 106. The monitoring event configuration status from the serving node for each event is conveyed by the HSS 104 to the SCEF 106. If the user is not registered in any serving node, the HSS 104 answers successfully and stores the configuration data related to the service; also, it indicates to the SCEF 106 that the user is absent, in the CIA, by setting the relevant bit in the S6t-HSS-Cause IE. For Monitoring if the data related to an immediate reporting is available in the HSS 104, the HSS 104 (e.g., as being received from the MME/SGSN 102 in the Insert Subscriber Data answer) includes this data in the CIA.

If an SCEF Reference ID received in a CIR command match with an SCEF Reference ID stored in the HSS 104 and both SCEF Reference ID are provided by the same SCEF ID, the HSS 104 deletes the stored cyclic prefix (CP) sets associated with the SCEF reference Id and store the new CP set(s). If CIR message includes combinations of monitoring events and CP parameter set it handles each set belonging to an SCEF Reference ID separately and sends a combined answer to the SCEF 106. If the SCEF-Reference-ID-for-Deletion is present, the receiving node deletes the corresponding monitoring event configuration, if stored. If the SCEF-Reference-ID is present, the receiving node stores the configuration event. If CIR message includes the CIR-Flags with delete all monitoring events, the HSS 104 may delete all Monitoring events configured by the SCEF for the subscriber. This includes forwarding the deletion to involved serving nodes.

In certain embodiments, the CIR message may include an Enhanced Coverage Restriction Configuration AVP set to get the status of the Enhanced Coverage Restriction parameter, and the HSS 104 responds by retrieving the value of the Enhanced Coverage Restriction parameter.

In other embodiments, if the CIR command includes the CIR-Flags AVP with the bit for Enhanced Coverage Query set (see below), the HSS 104 returns the current settings of Enhanced Coverage together with the current Serving PLMN-ID (if any) in the CIA command.

In certain embodiments, if the CIR command includes Enhanced-Coverage-Restriction AVP, the HSS 104 updates the subscription data for Enhanced Coverage; the update may be a complete replacement of any stored information with the received information. This may result in the need to update the MME/SGSN 102 via the S6a/d/MAP-Gr interface with the new value for access restriction. In certain such embodiments, however, there is no need for the HSS 104 to delay sending of CIA until updates of serving nodes are confirmed.

Behavior of the SCEF

According to certain embodiments, when the SCEF 106 receives a Monitoring Event Report AVP from the HSS 104 in the CIA command, the SCEF 106 handles it according to the procedures defined in 3GPP TS 23.682. When the SCEF 106 receives an architecture enhancements for service capability exposure (AESE)-Communication-Pattern-Config-Status AVP from the HSS 104 in a CIA command, the SCEF 106 handles it according to the procedures defined in 3GPP TS 23.682. If the SCEF 106 has included a number of CP pattern sets with several SCEF reference IDs in the request, it may handle each AESE-Communication-Pattern-Config-Status AVP separately according to the procedures defined in 3GPP TS 23.682. If the SCEF 106 receives a Supported-Services AVP it may only trigger those services that are supported by the HSS 104 and/or the MME/SGSN 102. The SCEF 106 stores the Supported-Services received from the HSS 104 and modifies them, if the HSS 104 reports change of capabilities. It may depend on SCEF implementation, if the SCEF 106 triggers only those services that are supported in both nodes when the UE is registered in both the MME and the SGSN.

In one embodiment, when the SCEF 106 receives an Enhanced-Coverage-Restriction-Information AVP from the HSS 104 in the CIA command, the SCEF 106 handles it according to the procedures defined in 3GPP TS 23.682.

In other embodiments, when the SCEF 106 queries the current settings of Enhanced Coverage Restriction, the SCEF 106 sends a CIR command to the HSS 104 with the corresponding bit in the CIR-Flags AVP set, unless the SCEF 106 knows that Enhanced Coverage Restriction Control is not supported by the HSS 104.

In certain embodiments, when the SCEF 106 needs to update the current settings of Enhanced Coverage Restriction, the SCEF 106 sends a CIR command to the HSS with the new values for Enhanced Coverage Restriction within the Enhanced-Coverage-Restriction AVP.

In certain embodiments, the SCEF 106 does not query and update the current settings of Enhanced Coverage Restriction using a single CIR command.

Configuration Information Request (CIR) Command

The configuration information request (CIR) command, indicated by the Command-Code field set to 8388718 and the "R" bit set in the Command Flags field, is sent from the SCEF 106 to the HSS 104. In certain embodiments, the CIR command message format is as follows:

```
< Configuration-Information-Request > ::=
< Diameter Header: 8388718, REQ, PXY,
16777345 >
    < Session-Id >
    [ DRMP ]
    { Auth-Session-State }
    { Origin-Host }
    { Origin-Realm }
    [ Destination-Host ]
    { Destination-Realm }
    { User-Identifier }
    [ OC-Supported-Features ]
    *[ Supported-Features ]
    *[ Monitoring-Event-Configuration ]
    [ CIR-Flags ]
    *[ AESE-Communication-Pattern ]
    [ Enhanced-Coverage-Restriction ]
    *[ Proxy-Info ]
    *[ Route-Record ]
    *[AVP]
```

Configuration-Information-Answer (CIA) Command

The Configuration-Information-Answer (CIA) command, indicated by the Command-Code field set to 8388718 and the "R" bit cleared in the Command Flags field, is sent from the HSS 104 to the SCEF 106. In certain embodiments, the CIA command message format is as follows:

```
< Configuration-Information-Answer > ::=
< Diameter Header: 8388718, PXY,
16777345 >
    < Session-Id >
    [ DRMP ]
    [ Result-Code ]
    [ Experimental-Result ]
    { Auth-Session-State }
    { Origin-Host }
    { Origin-Realm }
    [ OC-Supported-Features ]
    [ OC-OLR ]
    *[ Load ]
    *[ Supported-Features ]
    [ User-Identifier ]
    *[ Monitoring-Event-Report ]
    *[ Monitoring-Event-Config-Status ]
    *[ AESE-Communication-Pattern-Config-Status ]
    *[ Supported-Services ]
    [ S6t-HSS-Cause ]
    [ Enhanced-Coverage-Restriction-Data ]
    *[ Failed-AVP ]
    *[ Proxy-Info ]
    *[ Route-Record ]
    *[AVP]
```

Enhanced-Coverage-Restriction-Configuration

In certain embodiments, an Enhanced-Coverage-Restriction-Configuration AVP is of type Grouped, and it includes details for configuration for Enhanced Coverage Restriction. The AVP format may be as follows:

```
Enhanced-Coverage-Restriction-Configuration ::=
    <AVP header: xxxx yyyyy>
        [ SCEF-Reference-ID]
        { SCEF-ID}
        [ Enhanced-Coverage-Restriction-Type ]
        *[AVP]
```

Enhanced-Coverage-Restriction-Type

In certain embodiments, an Enhanced-Coverage-Restriction-Type AVP is of type Unsigned32. The following values are defined:

SET_ENHANCED_COVERAGE_RESTRICTION_
    TO_DISABLED (0)

SET_ENHANCED_COVERAGE_RESTRICTION_
    TO_ENABLED (1)

GET_STATUS_OF_ENHANCED_COVERAGE_R-
    ESTRICTION (2)

In an alternate embodiment, Enhanced-Coverage-Restriction-Type AVP may be encoded as a Bitmap, as follows:
Bit 0: If set it indicates that enhanced coverage restriction should be set to Disabled.
Bit 1: If set it indicates that enhanced coverage restriction should be set to Enabled.

Bit 2: If set it indicates that enhanced coverage restriction status needs to be retrieved from HSS.

Enhanced-Coverage-Restriction-Config-Status

In certain embodiments, an Enhanced-Coverage-Restriction-Config-Status AVP is of type Grouped, and it includes the details of the Error occurred during handling of the Requested action for the Enhanced Coverage Restriction Update. The AVP format may be as follows:

```
Enhanced-Coverage-Restriction::= <AVP header: xxxx yyyyy>
    *[ Service-Report]
    * [Enhanced-Coverage-Restriction-Information]
    { SCEF -Reference- ID }
    [ SCEF-ID]
    *[AVP]
```

Enhanced-Coverage-Restriction-Information

In certain embodiments, an Enhanced-Coverage-Restriction-Information AVP is of type Unsigned32. It indicates status of Enhanced Coverage Restriction configuration at the 104 HSS. The following values are defined:

ENHANCED_COVERAGE_RESTRICTION_IS_
    DISABLED (0)

ENHANCED_COVERAGE_RESTRIC-
    TION_IS_ENABLED (1)

Feature-List AVP for the S6t Application

In certain embodiments, a Feature-List AVP is updated to include an indication of an Enhanced-Coverage-Restriction-Control feature. The syntax of this AVP is defined in 3GPP TS 29.229. For the S6t interface, according to one embodiment, the meaning of the bits is as defined in TABLE 3 below.

TABLE 3

Features of Feature-List-ID used in S6t

| Feature bit | Feature | M/O | Description |
| --- | --- | --- | --- |
| 0 | MONTE | O | Configuration and reporting of monitoring events. This feature is applicable to from an SCEF with CIR/CIA command pair and the reporting of events to the SCEF with RIR/RIA command pair. If the HSS does not support this feature, the SCEF shall not send monitoring event configurations to the HSS within CIR. |
| 1 | AESE-Communication-Pattern | O | Configuration of CP parameter sets. This feature is applicable to from an SCEF with CIR/CIA command pair. If the HSS does not support this feature, the SCEF shall not send CP parameter set to the HSS within CIR. |
| 2 | NIDD-Authorization | O | Authorization of NIDD. This feature is applicable to from an SCEF with NIR/NIA command pair. If the HSS indicates in the NIA command that it does not support Authorization of NIDD, the SCEF shall not send NIDD Authorizations requests to the HSS in subsequent NIR commands towards that HSS. |
| 3 | Enhanced-Coverage-Restriction-Control | O | Control Of Enhanced Coverage Restriction. This feature is applicable for the CIR/CIA command pair. If the SCEF detects that the HSS does not support this feature, it may refrain from sending further CIR commands containing an Enhanced-Coverage-Restriction AVP or a CIR-Flags AVP with the bit for Enhanced-Coverage-Query set. |

CIR-Flags

As shown in TABLE 1, the CIR command may include a CIR-Flags AVP. In certain embodiments, the CIR-Flags AVP is of type Unsigned32 and includes a bit mask. In one embodiment, the meaning of the bits is as defined in TABLE 4.

TABLE 4

CIR-Flags

| Bit | Name | Description |
|---|---|---|
| 0 | Delete all Monitoring events | This bit shall be set if the SCEF wants to delete all Monitoring events for a subscriber stored in the HSS. |
| z | Enhanced Coverage Query | This bit shall be set if the SCEF wants to query the current settings of the Enhanced-Coverage-Restriction. |

NOTE:
Bits not defined in this table shall be cleared by the sender and discarded by the receiver of the command.

Enhanced-Coverage-Restriction

In one embodiment, the Enhanced-Coverage-Restriction AVP is of type Grouped and identifies either a complete (and possibly empty) list of serving PLMNs where Enhanced Coverage is restricted or a complete (and possibly empty) list of serving PLMNs where Enhanced Coverage is not restricted. The AVP format may be as follows:

```
Enhanced-Coverage-Restriction ::= <AVP header: xxx1 10415>
    [ Restricted-PLMN-List ]
    [ Allowed-PLMN-List ]
    *[AVP]
```

Enhanced-Coverage-Restriction-Data

In one embodiment, the Enhanced-Coverage-Restriction-Data AVP is of type Grouped and identifies the current visited PLMN (if any) and the current settings of Enhanced-Coverage-Restriction. The AVP format may be as follows:

```
Enhanced-Coverage-Restriction-Data ::= <AVP header: xxx2 10415>
    { Enhanced-Coverage-Restriction }
    [ Visited-PLMN-Id ]
    *[AVP]
```

Restricted-PLMN-List

In one embodiment, the Restricted-PLMN-List AVP is of type Grouped and identifies the complete set of serving PLMNs where Enhanced Coverage is restricted. The AVP format may be as follows:

```
Restricted-PLMN-List ::= <AVP header: xxx3 10415>
    *[ Visited-PLMN-Id ]
    *[AVP]
```

In certain embodiments, absence of Visited-PLMN-Id AVPs indicates that Enhanced Coverage is allowed in all serving PLMNs.

Allowed-PLMN-List

In one embodiment, the Allowed-PLMN-List AVP is of type Grouped and identifies the complete set of serving PLMNs where Enhanced Coverage is allowed. The AVP format may be as follows:

```
Allowed-PLMN-List ::=  <AVP header: xxx4 10415>
    *[ Visited-PLMN-Id ]
    *[AVP]
```

In certain embodiments, absence of Visited-PLMN-Id AVPs indicates that Enhanced Coverage is restricted in all serving PLMNs.

5G Network Example

Figure 3:
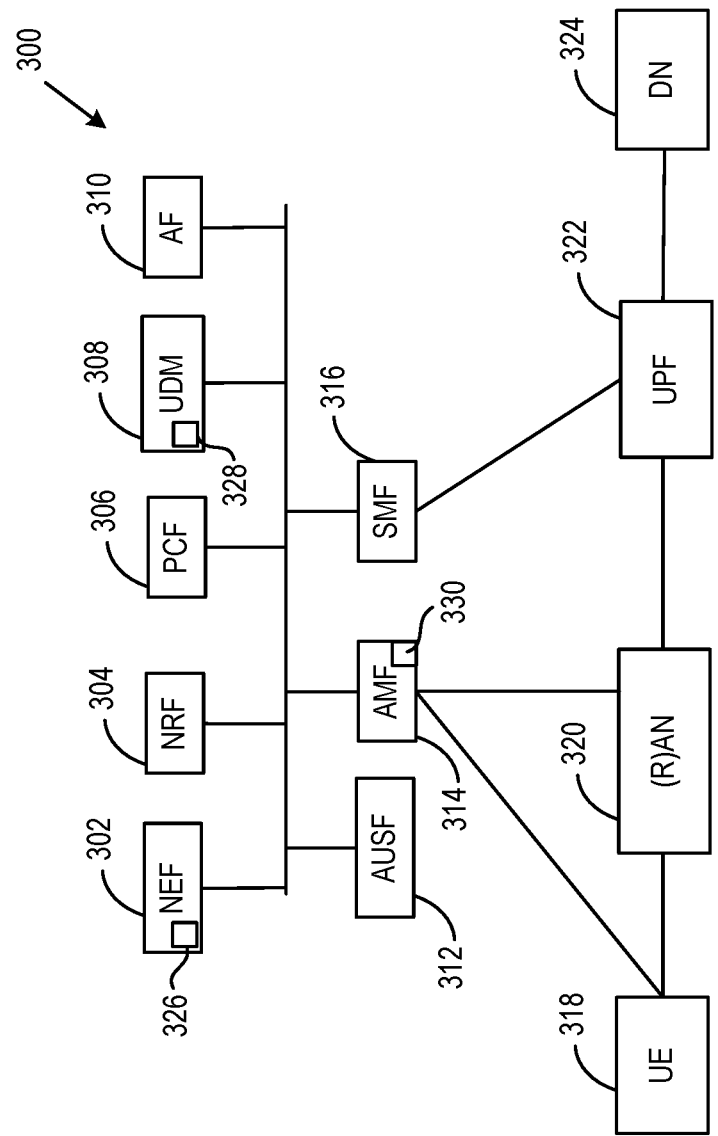
FIG. 3 is a block diagram of a 5G network architecture configured according to certain embodiments described herein.

As discussed above, the embodiments disclosed herein may be applied to a variety of different communication systems and architectures, and are not limited to the terminology or elements shown in FIG. 1. For example, FIG. 3 is a block diagram of a 5G network architecture 300 configured according to certain embodiments described herein. The 5G network architecture 300 is shown in a service based representation by way of example only. The 5G network architecture 300 includes, for example, an NEF 302, a network repository function (NRF) 304, a policy control function (PCF) 306, a UDM 308, an AF 310, an authentication server function (AUSF) 312, an access and mobility management function (AMF) 314, and a session management function (SMF) 316. Also shown are a UE 318, a (radio) access network ((R)AN) 320, a user plane function 322, and a data network (DN) 324.

In certain embodiments, functions such as the NEF 302, the UDM 308, and the AMF 314 may communicate with each other using a Diameter protocol. Thus, as shown in FIG. 3, the NEF 302 includes logic 326, the UDM 308 includes logic 328, and the AMF 314 includes logic 330 configured to perform the methods and operations described herein to enable restriction of coverage enhancement. Each of the logic 326, 328, 330 includes circuitry, computer-readable media comprising instructions for execution by a processor, and/or other means to perform the operations described herein. For example, the logic 328 of the UDM 308 may be configured to perform at least part of the operations described herein for the HSS 104 of FIG. 1, the logic 326 of the NEF 302 may be by configured to perform at least part of the operations described herein for the SCEF 106 of FIG. 1, and/or the logic 330 of the AMF 314 may be configured to perform at least part of the operations described herein for the MME/SGSN 102.

Figure 4:
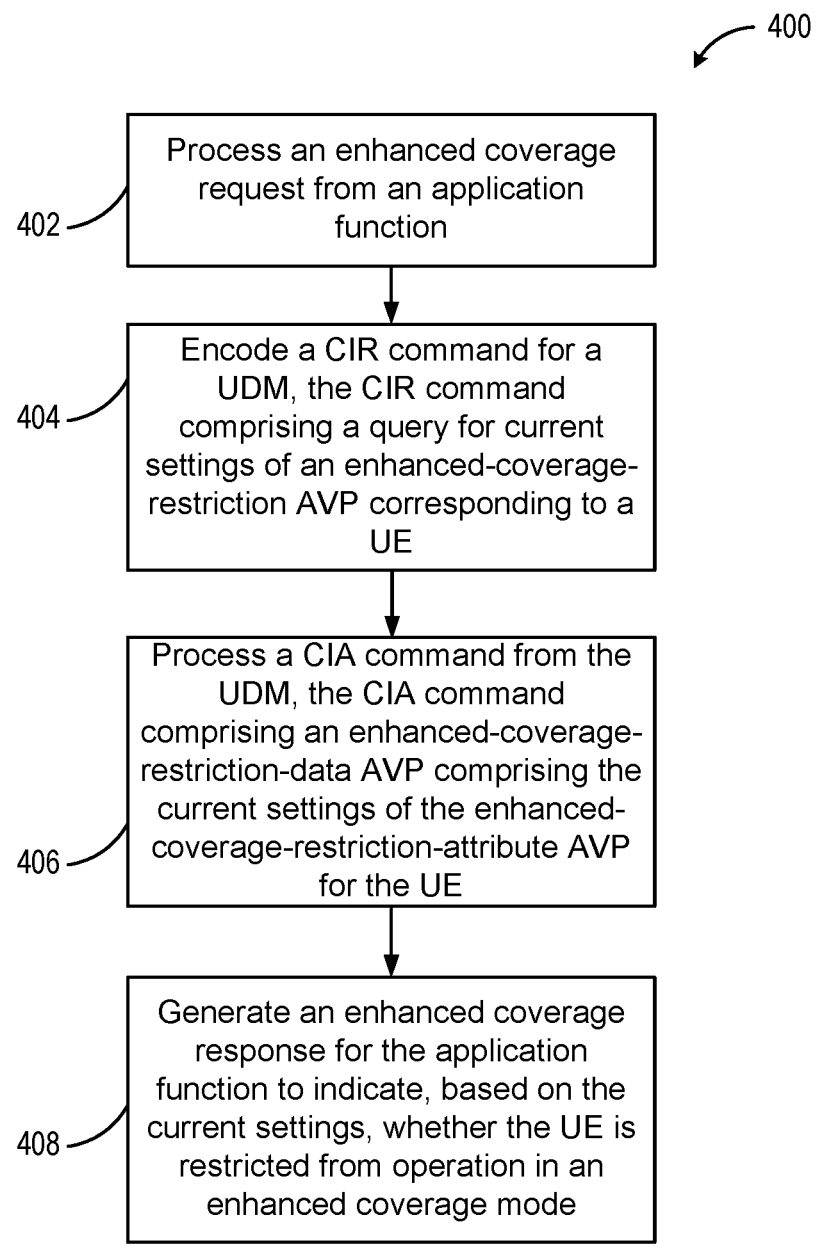
FIG. 4 is a flow diagram of a method for controlling enhanced coverage restrictions for a UE according to one embodiment.

FIG. 4 is a flow diagram of a method 400 for controlling enhanced coverage restrictions for a UE according to one embodiment. The method 400 may be performed, for example, by the NEF 302 shown in FIG. 3. The method 400 includes processing 402 an enhanced coverage request from an AF (e.g., the AF 310 shown in FIG. 3). The method 400 further includes encoding 404 a CIR command for a UDM (e.g., the UDM 308 shown in FIG. 3). The CIR command comprises a query for current settings of an enhanced-coverage-restriction AVP corresponding to a UE (e.g., the UE 318 shown in FIG. 3). The method 400 further includes processing 406 a CIA command from the UDM. The CIA command includes an enhanced-coverage-restriction-data AVP comprising the current settings of the enhanced-coverage-restriction-attribute AVP for the UE. The method 400 further includes generating 408 an enhanced coverage response for the AF to indicate, based on the current settings, whether the UE is restricted from operation in an enhanced coverage mode. Additional details of the method 400 are located throughout the present specification, including the Examples section.

ADDITIONAL EMBODIMENTS

In an alternative embodiment, the St6 interface is updated by extending monitoring event related AVPs. Example AVPs and procedures are described below.

Monitoring-Event-Configuration

The Monitoring-Event-Configuration AVP is of type Grouped, and it includes the details of the monitoring event from the SCEF. At least SCEF-Reference-ID or one SCEF-ReferenceID-for-Deletion may be present. The AVP format may be as follows:

```
Monitoring-Event-Configuration : := <AVP header: 3122 10415>
    [ SCEF-Reference-ID]
    { SCEF-ID}
    { Monitoring-Type}
    *[ SCEF-Reference-ID-for-Deletion]
    [Maximum-Number-of-Reports]
    [Monitoring-Duration]
    [ Charged-Party ]
    [Maximum-Detection-Time]
    [DE-Reachability-Configuration]
    [Location-Information-Configuration]
    [ Association-Type ]
    [Enhanced-Coverage-Restriction-Configuration]
    *[AVP]
```

In certain embodiments, at least one of the SCEF-Reference-ID or SCEF-Reference-ID-for-Deletion is present.

Monitoring-Event-Report

The Monitoring-Event-Report AVP is of type Grouped, and it includes the information to be reported as requested by Monitoring-Event-Configuration. The AVP format may be as follows:

```
Monitoring-Event-Report::= <AVP header: 3123 10415>
    { SCEF -Reference- ID }
    [ SCEF-ID]
    [ Visited-PLMN-Id]
    [Roaming-Information]
    [ IMEI-Change ]
    [Reachability-Information]
    [ EPS-Location-Information ]
    [ Monitoring-Type ]
    [Event-Handling]
    [Enhanced-Coverage-Restriction-Config-Status]
    *[ Service-Report]
    *[AVP]
```

Monitoring-Type

The Monitoring-Type AVP is of type Unsigned 32 and identifies the type of event to be monitored. The following values are defined:

| | |
|---|---|
| LOSS_OF_CONNECTIVITY | (0) |
| UE_REACHABILITY | (1) |
| LOCATION_REPORTING | (2) |
| CHANGE_OF_IMSI_IMEI(SV)_ASSOCIATION | (3) |
| ROAMING_STATUS | (4) |
| COMMUNICATION_FAILURE | (5) |
| AVAILABILITY_AFTER_DDN_FAILURE | (6) |
| NUMBER_OF_DES_PRESENT_IN_A_GEOGRAPHICAL_AREA | (7) |
| ENHANCED_COVERAGE_RESTRICTION | (8) |

Enhanced-Coverage-Restriction-Configuration
See above.
Enhanced-Coverage-Restriction-Type
See above.
Enhanced-Coverage-Restriction-Config-Status
See above.
Supported-Monitoring-Events The Supported-Monitoring-Events AVP is of type Unsigned64 and includes a bit mask. In one embodiment, the meaning of the bits are as defined in TABLE 5.

TABLE 5

Supported-Monitoring-Events

| Bit | Name | Description |
|---|---|---|
| 0 | UE and UICC and/or new IMSI-IMEI-SV association | This bit shall be set if Monitoring the association of the UE and UICC and/or new IMSI-IMEI-SV association Monitoring event is supported in the HSS |
| 1 | UE-reachability | This bit shall be set if UE reachability Monitoring event is supported in the HSS |
| 2 | Location-of-the-UE | This bit shall be set if Location of the UE and change in location of the UE Monitoring event is supported in the HSS |
| 3 | Loss-of-connectivity | This bit shall be set if Loss of connectivity Monitoring event is supported in the HSS |
| 4 | Communication-failure | This bit shall be set if Communication failure Monitoring event is supported in the HSS |
| 5 | Roaming-status | This bit shall be set if Roaming status (i.e. Roaming or No Roaming) of the UE, and change in roaming status of the UE Monitoring event is supported in the HSS |
| 6 | Availability after DDN failure | This bit shall be set if Availability after DDN failure Monitoring event is supported in the HSS |
| 7 | Enhanced Coverage Restriction | This bit shall be set if Enhanced Coverage Monitoring event is supported in the HSS |

NOTE:
Bits not defined in this table shall be cleared by the sender and discarded by the receiver of the command.

Subscriber Data Handling Procedures—Insert Subscriber Data

The Insert Subscriber Data Procedure (see, e.g., 3GPP TS 29.272) is used between the HSS and the MME and between the HSS and the SGSN for updating and/or requesting certain user data in the MME or SGSN in the following situations: due to administrative changes of the user data in the HSS and the user is now located in an MME or SGSN, i.e. if the user was given a subscription and the subscription has changed; subscription data that are applicable to MMEs but not to SGSNs should not be sent to the SGSN unless the SGSN is known to be a combined MME/SGSN; similarly subscription data that are applicable to SGSNs but not to MMEs should not be sent to the MME unless the MME is known to be a combined MME/SGSN; the operator has applied, changed or removed Operator Determined Barring for this user; activate subscriber tracing in the MME or the SGSN; to indicate to the MME or SGSN that the HSS has requested to be notified when the UE has become reachable; to request from the MME or SGSN the necessary data to support the T-ADS functionality; to retrieve location information and/or state information from the MME or the SGSN; to retrieve from the MME or the SGSN the Local Time Zone of the location in the visited network where the UE is attached; to update the STN-SR (e.g., as a result of an Sh interaction with an SCC-AS); to update the MME/SGSN with the identity of a dynamically allocated PDN GW as a result of the first PDN connection establishment associated with an APN over non 3GPP access; to update the MME with the identity of a PDN GW for Emergency Services as a result of the PDN connection establishment for Emergency Services over non 3GPP access; to indicate to the MME that the HSS has deregistered the MME for SMS; to indicate to the MME/SGSN that the HSS-based P-CSCF restoration procedure, as described in 3GPP TS 23.380, subclause 5.4, may be executed; to request the MME or the SGSN to configure and report the detection of Monitoring events, or delete stored Monitoring events configuration; and/or to request the MME or the SGSN to configure value of enhanced Coverage restriction parameter.

MME/SGSN Behavior

When receiving Enhanced-Coverage-Restriction-Parameter-value AVP(s) within the Subscription-Data AVP, the MME or SGSN replace stored Enhanced-CoverageRestriction-Parameter-value with the received information.

Subscription-Data

The Subscription-Data AVP is of type Grouped. It includes the information related to the user profile relevant for EPS and GERAN/UTRAN. The AVP format may be as follows:

```
Subscription-Data::= <AVP header: 1400 10415>
    [ Subscriber-Status ]
    [ MSISDN]
    [ A-MSISDN]
    [ STN-SR]
    [!CS-Indicator]
    [Network-Access-Mode]
    [Operator-Determined-Barring]
    [ HPLMN-ODB ]
    *10[ Regional-Subscription-Zone-Code]
    [ Access-Restriction-Data ]
    [ APN-OI-Replacement]
    [ LCS-Info]
    [ Teleservice-List]
    *[Call-Barring-Info]
    [ 3GPP-Charging-Characteristics ]
    [AMBR]
    [ APN-Configuration-Profile ]
    [RAT-Frequency-Selection-Priority-ID]
    [ Trace-Data]
    [ GPRS-Subscription-Data]
    *[ CSG-Subscription-Data]
    [Roaming-Restricted-Due-To-Unsupported-Feature]
    [Subscribed-Periodic-RAU-TAU-Timer]
    [ MPS-Priority ]
    [ VPLMN-LIPA-Allowed]
    [Relay-Node-Indicator]
    [MDT-User-Consent]
    [ Subscribed-VSRVCC]
    [Prose-Subscription-Data]
    [ Subscription-Data-Flags ]
    *[Adjacent-Access-Restriction-Data]
    [ DL-Buffering-Suggested-Packet-Count]
    *[ IMSI-Group-Id ]
    [ UE-U sage-Type ]
    *[ AESE-Communication-Pattern]
    *[Monitoring-Event-Configuration]
    * [ Enhanced-Coverage-Restriction-Configuration]
    [Emergency-Info]
    [ V2X-Subscription-Data]
    *[ AVP]
```

The AMBR included in this grouped AVP includes the AMBR associated to the user's subscription (UE-AMBR); Max-Requested-Bandwidth-UL and Max-RequestedBandwidth-DL within this AVP may not both be set to "0". The APN-OI-Replacement included in this grouped AVP includes the UE level APN-OI-Replacement associated to the user's subscription.

Insert-Subscriber-Data-Answer (IDA) Command

The Insert-Subscriber-Data-Answer (IDA) command, indicated by the Command-Code field set to 319 and the 'R' bit cleared in the Command Flags field, is sent from MME or SGSN to HSS or CSS. Message Format when used over the S6a or S6d interface:

```
< Insert-Subscriber-Data-Answer> : :=
< Diameter Header: 319, PXY, 16777251 >
    < Session-Id>
    [DRMP]
    [Vendor-Specific-Application-Id]
    *[ Supported-Features]
    [ Result-Code ]
    [Experimental-Result]
    { Auth-Session-State }
    { Origin-Host }
    { Origin-Realm }
    [IMS-Voice-Over-PS-Sessions-Supported]
    [ Last-DE-Activity-Time ]
    [RAT-Type]
    [ IDA-Flags ]
    [ EPS-User-State]
    [ EPS-Location-Information ]
    [Local-Time-Zone ]
    [ Supported-Services ]
    *[Monitoring-Event-Report]
    *[ Monitoring-Event-Config-Status
    *[ Enhanced-Coverage-Restriction-Config-Status]
    *[ AVP]
    *[ Failed-AVP]
    * [ Proxy-Info ]
    *[Route-Record]
```

Enhanced-Coverage-Restriction-Configuration

The Enhanced-Coverage-Restriction-Configuration AVP is of type Grouped, and includes the details for configuration for Enhanced Coverage Restriction. The AVP format may be as follows:

```
Enhanced-Coverage-Restriction-Configuration::=
<AVP header: xxxx yyyyy>
    [ SCEF-Reference-ID]
    { SCEF-ID}
    [ Enhanced-Coverage-Restriction-Parameter-value ]
    *[AVP]
```

Enhanced-Coverage-Restriction-Parameter-Value

The Enhanced-Coverage-Restriction-Parameter-value AVP is of type Unsigned32 and indicates the value of Enhanced Coverage Restriction Parameter. The following values are defined:

ENHANCED_COVERAGE_RESTRICTION_PARAMETER_DISABLED (0)

ENHANCED_COVERAGE_RESTRICTION_PARAMETER_ENABLED (1)

The default value when this AVP is not present is ENHANCED

COVERAGE_RESTRICTION_PARAMETER_DISABLED (0).

Enhanced-Coverage-Restriction-Config-Status

The Enhanced-Coverage-Restriction-Config-Status AVP is of type Grouped, and includes the details of the Error occurred during handling of the Requested action for the Enhanced Coverage Restriction Update. The AVP format may be as follows:

```
Enhanced-Coverage-Restriction::= <AVP header: xxxx yyyyy>
    *[ Service-Report]
    { SCEF -Reference- ID }
    [ SCEF-ID]
    *[AVP]
```

When serving node is changes, Enhanced Coverage Restriction Parameter stored in MME's UE context is sent to the new MME over SIO (GTP) interface.

Figure 5:
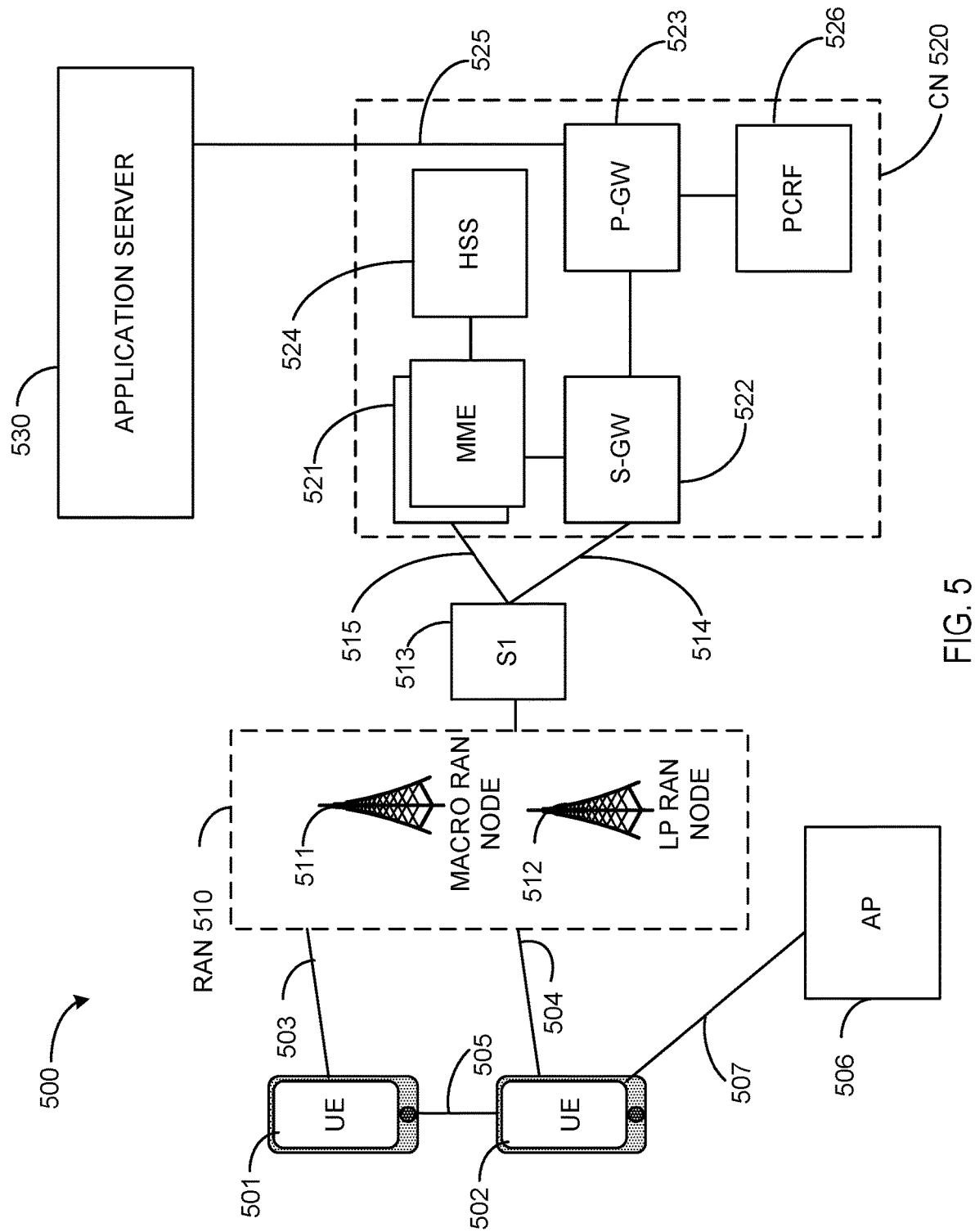
FIG. 5 illustrates an architecture of a system of a network in accordance with some embodiments.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510. The RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 may be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment the S1 interface 513 is split into two parts: the S1-U interface 514, which carries traffic data between the RAN nodes 511 and 512 and a serving gateway (S-GW) 522, and an S1-mobility management entity (MME) interface 515, which is a signaling interface between the RAN nodes 511 and 512 and MMEs 521.

In this embodiment, the CN 520 comprises the MMEs 521, the S-GW 522, a Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the CN 520 (e.g., an EPC network) and external networks such as a network including the application server 530 (alternatively referred to as application function (AF)) via an Internet Protocol (IP) interface 525. Generally, an application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. A Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
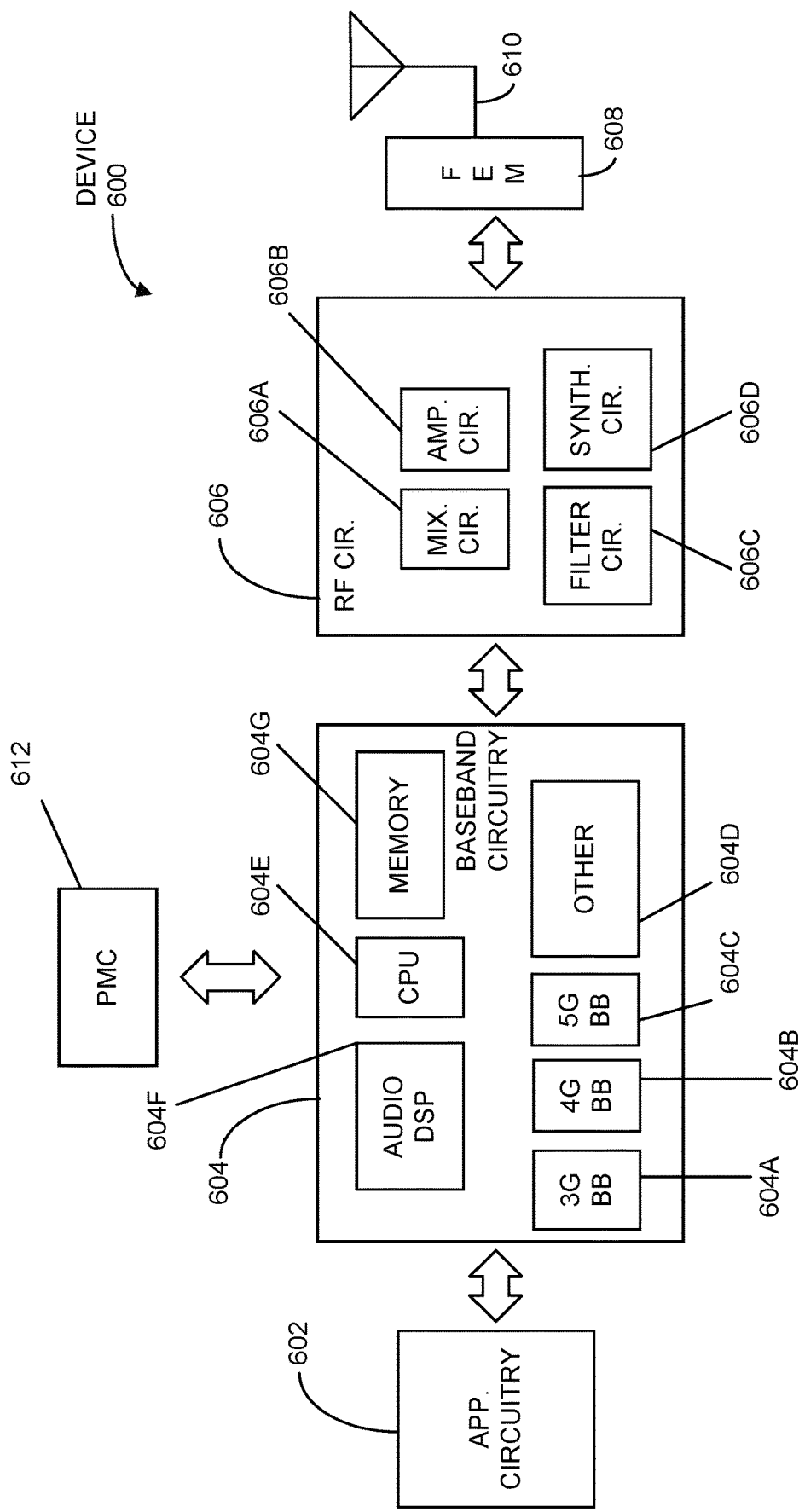
FIG. 6 illustrates example components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. The RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606A, amplifier circuitry 606B and filter circuitry 606C. In some embodiments, the transmit signal path of the RF circuitry 606 may include filter circuitry 606C and mixer circuitry 606A. RF circuitry 606 may also include synthesizer circuitry 606D for synthesizing a frequency for use by the mixer circuitry 606A of the receive signal path and the transmit signal path. In some embodiments, the mixer circuitry 606A of the receive signal path may be configured to down-convert RF signals received from the FEM circuitry 608 based on the synthesized frequency provided by synthesizer circuitry 606D. The amplifier circuitry 606B may be configured to amplify the down-converted signals and the filter circuitry 606C may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, the mixer circuitry 606A of the receive signal path may comprise passive mixers, although the scope of the embodiments is not limited in this respect.

In some embodiments, the mixer circuitry 606A of the transmit signal path may be configured to up-convert input baseband signals based on the synthesized frequency provided by the synthesizer circuitry 606D to generate RF output signals for the FEM circuitry 608. The baseband signals may be provided by the baseband circuitry 604 and may be filtered by the filter circuitry 606C.

In some embodiments, the mixer circuitry 606A of the receive signal path and the mixer circuitry 606A of the transmit signal path may include two or more mixers and may be arranged for quadrature downconversion and upconversion, respectively. In some embodiments, the mixer circuitry 606A of the receive signal path and the mixer circuitry 606A of the transmit signal path may include two or more mixers and may be arranged for image rejection (e.g., Hartley image rejection). In some embodiments, the mixer circuitry 606A of the receive signal path and the mixer circuitry 606A may be arranged for direct downconversion and direct upconversion, respectively. In some embodiments, the mixer circuitry 606A of the receive signal path and the mixer circuitry 606A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606D may be a fractional-N synthesizer or a fractional N/N+1 synthesizer, although the scope of the embodiments is not limited in this respect as other types of frequency synthesizers may be suitable. For example, synthesizer circuitry 606D may be a delta-sigma synthesizer, a frequency multiplier, or a synthesizer comprising a phase-locked loop with a frequency divider.

The synthesizer circuitry 606D may be configured to synthesize an output frequency for use by the mixer circuitry 606A of the RF circuitry 606 based on a frequency input and a divider control input. In some embodiments, the synthesizer circuitry 606D may be a fractional N/N+1 synthesizer.

In some embodiments, frequency input may be provided by a voltage controlled oscillator (VCO), although that is not a requirement. Divider control input may be provided by either the baseband circuitry 604 or the application circuitry 602 (such as an applications processor) depending on the desired output frequency. In some embodiments, a divider control input (e.g., N) may be determined from a look-up table based on a channel indicated by the application circuitry 602.

Synthesizer circuitry 606D of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 606D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. The FEM circuitry 608 may also include a transmit signal path which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM circuitry 608, or in both the RF circuitry 606 and the FEM circuitry 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by the RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device 600 is included in a UE. The PMC 612 may increase the power conversion efficiency while providing desirable implementation size and heat dissipation characteristics.

FIG. 6 shows the PMC 612 coupled only with the baseband circuitry 604. However, in other embodiments, the PMC 612 may be additionally or alternatively coupled with, and perform similar power management operations for, other components such as, but not limited to, the application circuitry 602, the RF circuitry 606, or the FEM circuitry 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
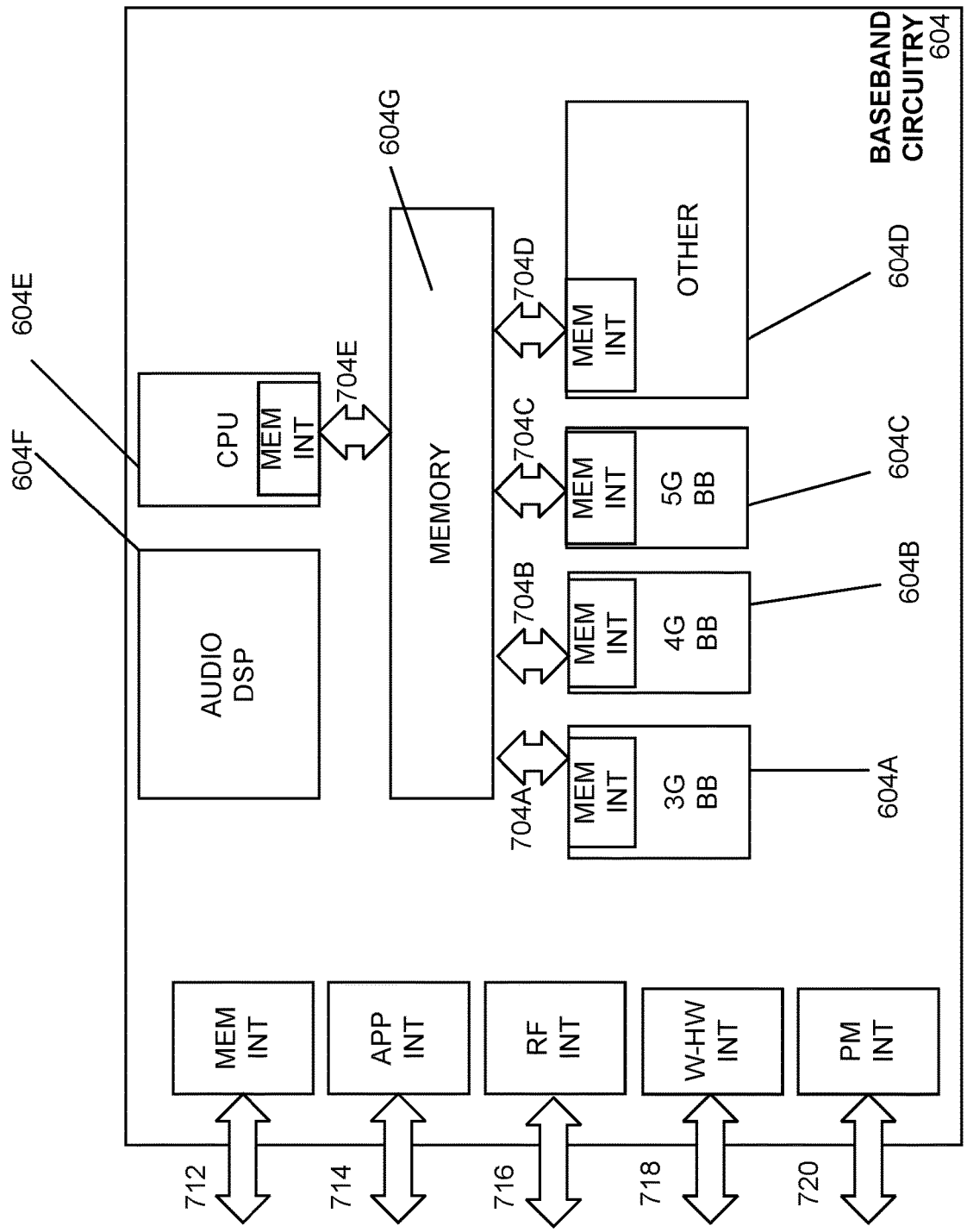
FIG. 7 illustrates example interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
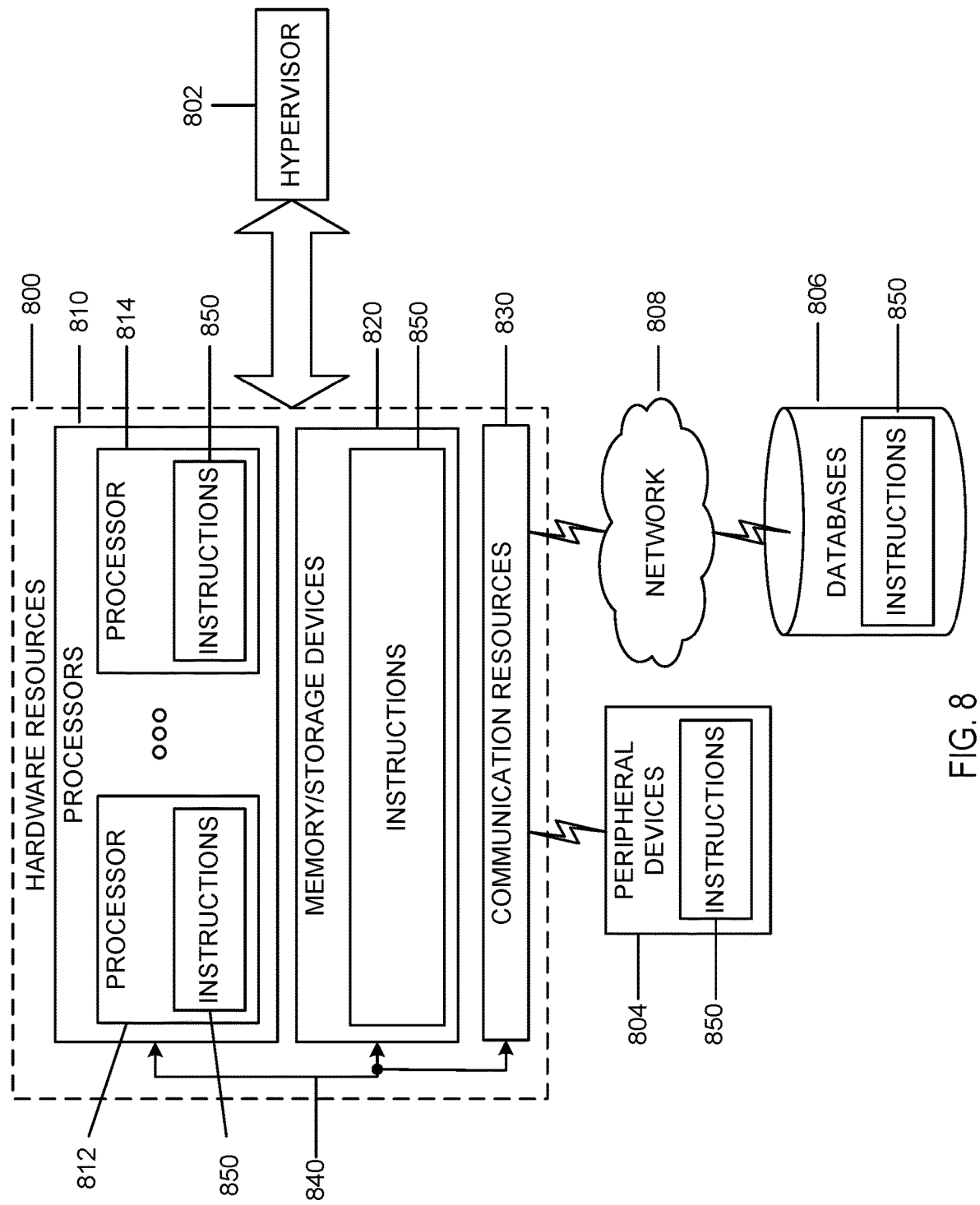
FIG. 8 is a block diagram illustrating components, according to some example embodiments, able to read instructions from a machine-readable or computer-readable medium.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may include other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device (s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

EXAMPLES

The following examples pertain to further embodiments.

Example 1 is an apparatus for a service capability exposure function (SCEF) of a wireless communication system. The apparatus includes a memory interface and a processor. The memory interface is to send or receive, to or from a memory device, a value for an identifier of a user equipment (UE). The processor is to: process an enhanced coverage request from a server, the enhanced coverage request including the identifier of the UE; in response to the enhanced coverage request, store the UE identifier through the memory interface and generate a configuration information request (CIR) for a home subscriber server (HSS), the CIR comprising the identifier of the UE and an enhanced-coverage-restriction attribute-value pair (AVP) to query enhanced coverage restrictions for the UE; process a configuration information answer (CIA) from the HSS, the CIA comprising an enhanced-coverage-restriction-data AVP indicating current settings of the enhanced coverage restrictions for the UE; and generate an enhanced coverage response for the server to indicate, based on the current settings of the enhanced coverage restrictions for the UE, whether the UE is restricted from operation in an enhanced coverage mode.

Example 2 is the apparatus of Example 1, wherein the processor generates the CIR to communicate through a Diameter based interface to the HSS, and wherein the CIA is received through the Diameter based interface from the HSS.

Example 3 is the apparatus of Example 2, wherein the Diameter based interface comprises an S6t interface using a Diameter protocol.

Example 4 is the apparatus of any of Examples 1-3, wherein the CIR further comprises a CIR-flags AVP, and wherein to query the enhanced coverage restrictions for the UE the processor is configured to set a corresponding bit in the CIR-flags AVP to query current settings of the enhanced-coverage-restriction AVP.

Example 5 is the apparatus of any of Examples 1-3, wherein before the processor generates the CIR in response to the enhanced coverage request from the server, the processor determines that a feature-list AVP indicates that the HSS supports control of enhanced coverage restrictions.

Example 6 is the apparatus of any of Examples 1-3, wherein the server comprises at least one of a services capability server (SCS) and an application server (AS).

Example 7 is the apparatus of any of Examples 1-3, wherein the identifier of the UE comprises at least one of an external identifier and a mobile station international subscriber directory number (MSISDN).

Example 8 is the apparatus of any of Examples 1-3, wherein the enhanced coverage request from the server further includes an SCS/AS identifier, a transaction identifier, and a request type, and wherein the request type indicates a query for a status of the enhanced coverage restrictions for the UE.

Example 9 is the apparatus of Example 8, wherein in response to the enhanced coverage request, the processor is further to assign an SCEF reference identifier (ID) and store the transaction identifier and the SCS/AS identifier through the memory interface.

Example 10 is the apparatus of Example 9, wherein the CIR further comprises the SCEF reference ID, an SCEF ID, and the request type.

Example 11 is the apparatus of Example 9, wherein the CIA from the HSS further includes the SCEF reference ID.

Example 12 is the apparatus of Example 9, wherein the enhanced coverage response to the server further includes the transaction identifier.

Example 13 is a computer-readable storage medium having computer-readable instructions stored thereon, the computer-readable instructions to, when executed, instruct a processor of a network exposure function (NEF) to: process an enhanced coverage request from an application function; in response to the enhanced coverage request, encode a configuration information request (CIR) command for a unified data management function (UDM), the CIR command comprising a query for current settings of an enhanced-coverage-restriction attribute-value pair (AVP) corresponding to a user equipment (UE); process a configuration information answer (CIA) command from the UDM, the CIA command comprising an enhanced-coverage-restriction-data AVP comprising the current settings of the enhanced-coverage-restriction-attribute AVP for the UE; and generate an enhanced coverage response for the application function to indicate, based on the current settings, whether the UE is restricted from operation in an enhanced coverage mode.

Example 14 is the computer-readable storage medium of Example 14, wherein the NEF communicates the CIR command to the UDM and the CIA command from the UDM through a Diameter based interface.

Example 15 is the computer-readable storage medium of Example 14, wherein the CIR command comprises a CIR-flags AVP comprising a bit set to indicate the query for the current settings of the enhanced-coverage-restriction AVP.

Example 16 is an apparatus for a home subscriber server (HSS), the apparatus includes a first interface and a processor. The first interface to receive, from a service capability exposure function (SCEF), a configuration information request (CIR) command comprising a query for a current setting of an enhanced coverage restriction corresponding to a user equipment (UE). The processor to encode a configuration information answer (CIA) command to provide to the SCEF through the first interface, the CIA command comprising enhanced coverage restriction data including the current setting of the enhanced coverage restriction corresponding to the UE.

Example 17 is the apparatus of Example 16, wherein the first interface comprises a diameter based S6t interface, and wherein the CIR command comprises an enhanced-coverage-restriction attribute-value pair (AVP).

Example 18 is the apparatus of Example 17, wherein the CIR command further comprises a CIR-flags AVP including a set corresponding bit to query current settings of the enhanced-coverage-restriction AVP.

Example 19 is the apparatus of any of Examples 16-18, further comprising a second interface to send, to a mobility management entity (MME) or serving general packet radio service (GPRS) supporting node (SGSN), an insert subscriber data request to determine whether or not an enhanced coverage mode is allowed for the UE under current load conditions.

Example 20 is the apparatus of Example 19, wherein the processor is further to decode an insert subscriber data answer received through the second interface to indicate whether the enhanced coverage mode is allowed for the UE.

Example 21 is the apparatus of Example 19, wherein the second interface comprises a diameter based interface selected from at least one of an S6a interface and an S6d interface.

Example 22 is a computer-readable storage medium having computer-readable instructions stored thereon, the computer-readable instructions to, when executed, instruct a processor of a first network node to: process an insert subscriber data message from a second network node; in response to the insert subscriber data message, determine whether or not an enhanced coverage mode is allowed under current load conditions; and encode an insert subscriber data answer to send to the second node to indicate whether or not the enhanced coverage mode is allowed.

Example 23 is the computer-readable storage medium of Example 22, wherein the insert subscriber data answer includes an enhanced coverage restricted parameter value attribute-value pair (AVP).

Example 24 is the computer-readable storage medium of any of Examples 22-23, wherein the first node comprises a mobility management entity (MME) and the second node comprises a home subscriber server (HSS).

Example 25 is the computer-readable storage medium of any of Examples 22-23, wherein the first node comprises a serving general packet radio service (GPRS) supporting node (SGSN) and the second node comprises a home location register (HLR).

Example 26 is the computer-readable storage medium of any of Examples 22-23, wherein the first node comprises an access and mobility management function (AMF) and the second node comprises a unified data management function (UDM).

Example 27 may include a user equipment (UE) device that has enhancements and optimizations for features and capabilities relating to Cellular Internet of Things (CIoT) for connecting to an EPS network or GPRS network that is also enhanced for CIoT features. The EPS network may include entities such as eNB, MME, SGW, PGW, SCEF (Service Capability Exposure Function), etc. The GPRS network may include entities such as MS, BS, SGSN, HLR, etc.

Example 28 may include the SCEF of Example 27 and/or some other Example herein, wherein the SCEF receives a request from an external entity such as SCS/AS (Application Server) about the need to use enhanced coverage to transfer data and the network is overloaded in terms of radio and signaling resources and the operator wants to restrict certain subscribers from using enhanced coverage.

Example 29 may include the SCEF of Example 28 and/or some other Example herein, wherein the SCEF obtains information about support for restriction of use of enhanced coverage in Enhanced Coverage Restriction Configuration as part of Configuration Information Request (CIR) and Configuration Information Answer (CIA) messages as part of S6t interface.

Example 30 may include the MME of Example 28 and/or some other Example herein, wherein the MME receives an Insert Subscriber Data message from the HSS to determine if enhanced coverage can be allowed or not under current load conditions using Enhanced Coverage Restriction Configuration AVP. The Enhanced coverage restricted parameter value for a UE is set on a per PLMN basis. Example 30 may also include the SGSN of Example 28 wherein the SGSN receives an Insert Subscriber Data message from the HLR to determine if enhanced coverage can be allowed or not under current load conditions using Enhanced Coverage Restriction Configuration AVP.

Example 31 may include the MME of Example 28 and/or some other Example herein, wherein the MME determines if enhanced coverage can be allowed or not and includes the Enhanced coverage restricted parameter value in the Insert Subscriber Data message to the HSS.

Example 32 may include the external entity SCS or AS of Example 28 and/or some other Example herein, wherein the external entity does not use enhanced coverage feature if the Enhanced coverage restricted parameter sent by the network prohibits UE or MS from using so.

Example 33 may include an apparatus comprising means to perform one or more elements of a method described in or related to any of Examples 1-32, or any other method or process described herein.

Example 34 may include one or more non-transitory computer-readable media comprising instructions to cause an electronic device, upon execution of the instructions by one or more processors of the electronic device, to perform one or more elements of a method described in or related to any of Examples 1-32, or any other method or process described herein.

Example 35 may include an apparatus comprising logic, modules, and/or circuitry to perform one or more elements of a method described in or related to any of Examples 1-32, or any other method or process described herein.

Example 36 may include a method, technique, or process as described in or related to any of Examples 1-32, or portions or parts thereof.

Example 37 may include an apparatus comprising: one or more processors and one or more computer readable media comprising instructions that, when executed by the one or more processors, cause the one or more processors to perform the method, techniques, or process as described in or related to any of Examples 1-32, or portions thereof.

Example 38 may include a method of communicating in a wireless network as shown and described herein.

Example 39 may include a system for providing wireless communication as shown and described herein.

Example 40 may include a device for providing wireless communication as shown and described herein.

It will be understood by those having skill in the art that many changes may be made to the details of the above-described embodiments without departing from the underlying principles of the invention. The scope of the present invention should, therefore, be determined only by the following claims.

The invention claimed is:

1. An apparatus for a service capability exposure function (SCEF) of a wireless communication system, the apparatus comprising:
a memory interface to send or receive, to or from a memory device, a value for an identifier of a user equipment (UE); and
a processor to:
process an enhanced coverage request from a server, the enhanced coverage request including the identifier of the UE;
in response to the enhanced coverage request, generate a configuration information request (CIR) for a home subscriber server (HSS), the CIR comprising the identifier of the UE and an attribute-value pair (AVP) to query enhanced coverage restrictions for the UE;
process a configuration information answer (CIA) from the HSS, the CIA comprising data AVP indicating current settings of the enhanced coverage restrictions for the UE; and
generate an enhanced coverage response for the server to indicate, based on the current settings of the enhanced coverage restrictions for the UE, whether the UE is restricted from operation in an enhanced coverage mode.

2. The apparatus of claim 1, wherein the processor generates the CIR to communicate through a Diameter based interface to the HSS, and wherein the CIA is received through the Diameter based interface from the HSS.

3. The apparatus of claim 2, wherein the Diameter based interface comprises an S6t interface using a Diameter protocol.

4. The apparatus of claim 3, wherein the CIR further comprises a CIR-flags AVP, and wherein to query the enhanced coverage restrictions for the UE the processor is configured to set a corresponding bit in the CIR-flags AVP to query current settings of the AVP.

5. The apparatus of claim 3, wherein before the processor generates the CIR in response to the enhanced coverage request from the server, the processor determines that a feature-list AVP indicates that the HSS supports control of enhanced coverage restrictions.

6. The apparatus of claim 3, wherein the server comprises at least one of a services capability server (SCS) and an application server (AS).

7. The apparatus of claim 3, wherein the identifier of the UE comprises at least one of an external identifier and a mobile station international subscriber directory number (MSISDN).

8. The apparatus of claim 3, wherein the enhanced coverage request from the server further includes an SC S/AS identifier, a transaction identifier, and a request type, and wherein the request type indicates a query for a status of the enhanced coverage restrictions for the UE.

9. The apparatus of claim 8, wherein in response to the enhanced coverage request, the processor is further to assign an SCEF reference identifier (ID) and store the transaction identifier and the SC S/AS identifier through the memory interface.

10. The apparatus of claim 9, wherein the CIR further comprises the SCEF reference ID, an SCEF ID, and the request type.

11. The apparatus of claim 9, wherein the CIA from the HSS further includes the SCEF reference ID.

12. The apparatus of claim 9, wherein the enhanced coverage response to the server further includes the transaction identifier.

13. A non-transitory computer-readable storage medium having computer-readable instructions stored thereon, the computer-readable instructions to, when executed, instruct a processor of a first network node to:
process an enhanced coverage request from an application function;
in response to the enhanced coverage request, encode a configuration information request (CIR) command for a second network node, the CIR command comprising a query for current settings of an enhanced-coverage-restriction attribute-value pair (AVP) corresponding to a user equipment (UE);
process a configuration information answer (CIA) command from the second network node, the CIA command comprising an enhanced-coverage-restriction-data AVP comprising the current settings of the enhanced-coverage-restriction-attribute AVP for the UE; and
generate an enhanced coverage response for the application function to indicate, based on the current settings, whether the UE is restricted from operation in an enhanced coverage mode.

14. The non-transitory computer-readable storage medium of claim 13, wherein the first network node comprises a network exposure function (NEF) and the second network node comprises a unified data management function (UDM), and wherein the NEF communicates the CIR command to the UDM and the CIA command from the UDM through a Diameter based interface.

15. The non-transitory computer-readable storage medium of claim 14, wherein the CIR command comprises a CIR-flags AVP comprising a bit set to indicate the query for the current settings of the enhanced-coverage-restriction AVP.

16. An apparatus for a home subscriber server (HSS), the apparatus comprising:
a first interface to receive, from a service capability exposure function (SCEF), a configuration information request (CIR) command comprising a query for a current setting of an enhanced coverage restriction corresponding to a user equipment (UE); and
a processor to encode a configuration information answer (CIA) command to provide to the SCEF through the first interface, the CIA command comprising enhanced coverage restriction data including the current setting of the enhanced coverage restriction corresponding to the UE,
wherein the first interface comprises a diameter based S6t interface, and
wherein the CIR command comprises an enhanced-coverage-restriction attribute-value pair (AVP).

17. The apparatus of claim 16, wherein the CIR command further comprises a CIR-flags AVP including a set corresponding bit to query current settings of the enhanced-coverage-restriction AVP.

18. The apparatus of claim 17, further comprising a second interface to send, to a mobility management entity (MME) or serving general packet radio service (GPRS) supporting node (SGSN), an insert subscriber data request to determine whether or not an enhanced coverage mode is allowed for the UE under current load conditions.

19. The apparatus of claim 18, wherein the processor is further to decode an insert subscriber data answer received through the second interface to indicate whether the enhanced coverage mode is allowed for the UE.

20. The apparatus of claim 18, wherein the second interface comprises a diameter based interface selected from at least one of an S6a interface and an S6d interface.

* * * * *